US005168899A

United States Patent [19]

Cerrone et al.

[11] Patent Number: 5,168,899

[45] Date of Patent: Dec. 8, 1992

[54] INCHING VALVE FOR POWER-SHIFT TRANSMISSIONS, PARTICULARLY FOR LIFT TRUCKS

[75] Inventors: Carmine Cerrone, Nichelino; Gabriele Mussa, Turin, both of Italy

[73] Assignee: Graziano Transmissioni S.p.A., Italy

[21] Appl. No.: 714,219

[22] Filed: Jun. 12, 1991

[30] Foreign Application Priority Data

Jun. 15, 1990 [IT] Italy .............................. 67438 A/90

[51] Int. Cl.[5] ..................... F15B 13/042; F16D 67/04

[52] U.S. Cl. ................................ 137/625.66; 91/433; 192/12 C; 192/13 R

[58] Field of Search ................. 137/625.66; 192/12 C, 192/13 R; 91/433

[56] References Cited

U.S. PATENT DOCUMENTS

| | | | |
|---|---|---|---|
| 3,696,897 | 10/1972 | Kitano et al. | 192/13 R X |
| 3,853,210 | 12/1974 | Kitano et al. | 192/13 R X |
| 3,948,366 | 4/1976 | Kitano et al. | 192/13 R X |
| 4,150,737 | 4/1979 | Patton | 192/13 R |

*Primary Examiner*—Gerald A. Michalsky
*Attorney, Agent, or Firm*—Armstrong & Kubovcik

[57] ABSTRACT

The stem of an inching valve for a power-shift transmission, particularly for lift trucks, is controlled by a hydraulically-operated piston whose axis is distinct from and parallel to the axis of the stem and which is connected to the stem by means of a mechanical transmission. The risk of contamination of the fluid used for operating the piston (which is the fluid of the vehicle's braking circuit) by the oil used in the power-shift transmission is thus avoided.

2 Claims, 1 Drawing Sheet

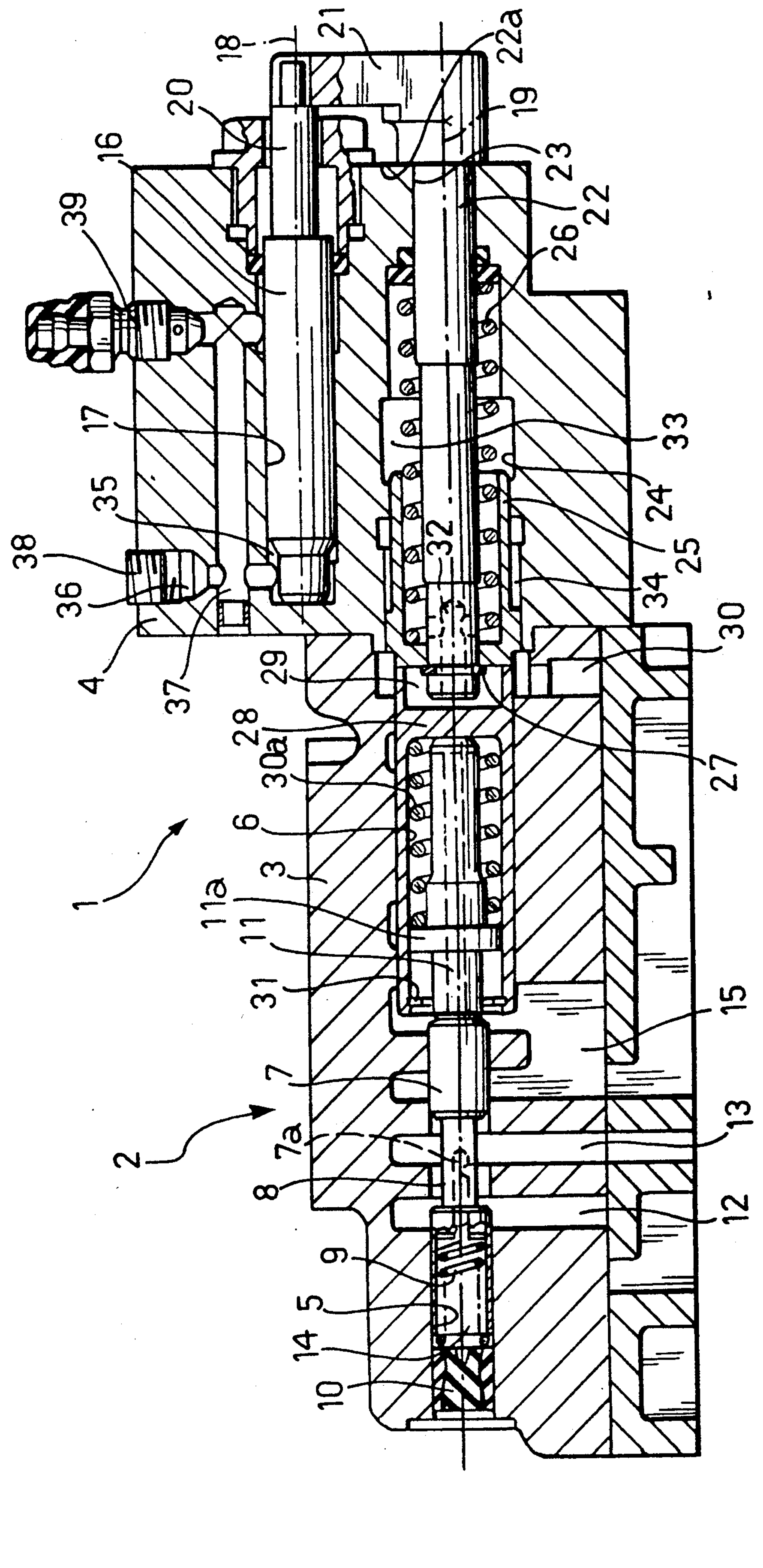
1
2
3
4
5
6
7
7a
8
9
10
11
11a
12
13
14
15
16
17
18
19
20
21
22
22a
23
24
25
26
27
28
29
30
30a
31
32
33
34
35
36
37
38
39

INCHING VALVE FOR POWER-SHIFT TRANSMISSIONS, PARTICULARLY FOR LIFT TRUCKS

BACKGROUND

1. Field of the Invention

The present invention relates to an inching valve for power-shift transmissions, particularly for lift trucks.

2. Description of Related Art

Inching valves associated with power-shift transmissions (which use several multiple-disc clutches engageable selectively to obtain the various gear ratios) are well known in the art and are used to achieve a slow forward speed of the lift truck, for example, during the stage when it approaches a load to be lifted, even when the internal combustion engine of the truck is kept running at full speed to enable the lifting device to be raised rapidly.

In more conventional solutions, the stem of the inching valve is controlled by the operator by means of a pedal which is connected to the stem through a mechanical transmission. More recent solutions provide for the hydraulic control of the stem of the inching valve. In this case also, the operator controls the valve by means of a pedal but the action of the pedal is transmitted to the valve stem by means of a hydraulic device. With this technique, the piston which controls the stem of the inching valve is operated by the same fluid as is used in the vehicle's braking circuit. In this case, the pedal which controls the inching valve is also the brake pedal of the vehicle.

With inching valves produced in accordance with this known technique, however, there is a risk of the circuit for the brake fluid being contaminated from the hydraulic circuit of the power-shift transmission. Typically, the fluid used in the power-shift transmission, which is also intended to pass through the inching valve, is a lubricating oil which is incompatible with the fluid normally used in the braking circuit. The seals used for the conventional mineral oil which flows through the inching valve are not compatible with the fluid used in the braking circuit, and vice versa. Sometimes, some of the mineral oil from the transmission enters the circuit reserved for the brake fluid and mixes with that fluid, causing the rapid deterioration of the seals of the master cylinder and wheel cylinders of the vehicle's brakes.

SUMMARY OF THE INVENTION

In particular, the invention relates to an inching valve comprising a valve body; a valve stem movable between rest position in which an inlet of the valve connected to a pressurized-fluid supply duct communicates with an outlet connected to the circuit downstream of the valve, and an operative position in which the inlet is isolated and the outlet communicates with a discharge, and a hydraulically-operated piston for controlling the position of the valve stem.

BRIEF DESCRIPTION OF THE DRAWING

The single drawing shows a longitudinal section of a valve according to the invention.

DESCRIPTION OF THE PREFERRED EMBODIMENT

The object of the present invention is to provide a valve of the aforesaid type which does not have the aforementioned disadvantage.

According to the invention, this object is achieved by virtue of a valve of the type specified above, characterised in that the hydraulically-operated auxiliary piston for controlling the position of the stem of the inching valve is arranged on an axis distinct from and parallel to the axis of the stem of the inching valve and is operatively connected to the stem by means of a mechanical transmission.

This arrangement makes it virtually impossible for the transmission oil to leak into the region reserved for the brake fluid and vice versa.

The hydraulically-operated piston for controlling the position of the stem of the inching valve is preferably arranged above the axis of the stem of the inching valve. The contamination of the brake fluid by the transmission oil (which has more dangerous consequences than the contamination of the transmission oil by the brake fluid since it renders the braking system of the vehicle inefficient) is thus made absolutely impossible as the aforesaid leakage is opposed by gravity.

Further characteristics of the invention will become clear from the description which follows with reference to the appended drawing, provided purely by way of non-limiting example.

In the drawing, a hydraulically-operated inching valve for a power-shift transmission system of a lift truck is generally indicated 1. The valve 1 comprises a body 2 including two parts 3, 4 fixed together by screws (not shown in the drawing).

The part 2 has a cylindrical through-hole with a smaller-diameter portion 5 and a larger-diameter portion 6. The stem 7 of the inching valve is slidable in the smaller-diameter portion 5 and has an intermediate portion of narrow diameter which, together with the wall of the hole 5, defines an annular chamber 8.

The left-hand end of the stem 7 (with reference to the drawing) is acted upon by a helical spring 9 interposed between the stem 7 and a closure plug 10 inserted in the hole 5. The opposite end of the stem 7 is in contact with the end of a second stem 11 whose function will be explained below.

The chamber 8 puts an inlet 12 connected to the supply duct for the pressurised fluid (the mineral oil used in the power-shift transmission) into communication with an outlet 13 connected to the part of the hydraulic circuit of the transmission which is downstream of the valve. Essentially, the pressurised fluid supplied downstream of the valve is intended selectively to operate a series of multiple-disc clutches provided in the gearbox in order to actuate the various gear ratios desired.

The chamber 8 also communicates with a chamber 14 defined between the stem 7 and the plug 10 through a duct *7a* formed in the stem 7.

The stem 7 can be moved to the right (still with reference to the drawing) towards an operative position in which communication between the inlet 12 and the chamber 8 is cut off, whilst the chamber 8 puts the outlet 13 into communication with a discharge aperture 15 connected to a discharge reservoir. In this position, therefore, the pressurised fluid downstream of the valve is discharged through the chamber 8 and the outlet 15, releasing pressure from the multiple-disc clutches of the gearbox. The pressure exerted on the multiple-disc clutches can thus be controlled with the desired precision by controlling the position of the stem 7 so that the advance of the vehicle can be controlled as desired even when the engine is running fast because the lifting device of the lift truck is in operation. The operator achieves this, on the one hand, by keeping the engine running fast by means of the vehicle's accelerator and, at the same time, by pressing the pedal which controls the inching valve, the speed of advance of the vehicle being slower the more the valve-control pedal is pressed.

In the device according to the invention, the position of the stem 7 of the inching valve is controlled by a piston 16 which is slidable in a hole 17 formed in the part 4. As can be seen in the drawings, this hole has an axis 18 distinct from and parallel to the axis 19 of the stem 7. Moreover, when the valve is fitted in the vehicle, the hole 17 is above the axis 19. The piston 16 has a rod 20 which projects from the part 4 and is connected by a rigid connection member 21 to an auxiliary piston 22 which is slidable in a narrow end portion 23 of a cylindrical hole 24 formed in the part 4 as a coaxial extension of the hole 6. A cup-shaped sleeve 25 is slidable on the piston 22. A helical spring 26 is interposed between the end wall of the cup-shaped sleeve 25 and an annular abutment surface of the hole 24 so as to urge the sleeve 25 towards the left with reference to the drawing. The sleeve 25 consequently urges the piston 22 towards the left, by means of a resilient ring 27, so as to hold an annular abutment 22*a* of the connection member 21 against the outer surface of the element 4. In this condition, the left-hand end surface of the sleeve 25 (with reference to the drawing) is in contact with the corresponding end surface of a further sleeve 28 which is slidable in the hole 6. A chamber 29 defined between the end wall of the sleeve 28 and the end wall of the sleeve 25 communicates with a discharge aperture 30 through notches formed in the end edge of the sleeve 28. The stem 11 has a piston 11*a* which is slidable in the sleeve 28. A helical spring 30*a* is interposed between the piston 11*a* and the end wall of the sleeve 28 and tends to hold the stem 11 against the stem 7. The piston 11*a* can move to the left relative to the sleeve 28 from this position until it reaches the end position defined by a resilient ring 31 mounted in the end opening of the sleeve 28.

The chamber 29 which communicates with the discharge aperture 30 also communicates with the chamber 33 defined between the piston 22 and the end wall 24 through ducts 32 formed in the piston 22. The annular chamber 34 defined between the wall of the hole 24 and the outer surface of the sleeve 25, however, communicates with the chamber 14 of the valve through a duct not visible in the drawing.

With reference again to the operating piston 16, this piston can be moved to the right (with reference to the drawing) from the rest position shown in the drawing (which corresponds to the engagement of the abutment surface 22*a* with the abutment surface of the part 4) by the supply of pressurised fluid to a chamber 35 through an aperture 36 and a supply duct 37. The aperture 36 can be closed by a plug 37 for the storage and transportation of the valve. The supply duct 37 also communicates with a bleeder valve 39 of the braking circuit. The aperture 36 is intended to be connected to the braking circuit of the vehicle and therefore receives pressurised fluid from the braking circuit. As indicated at the beginning of the present description, this fluid is different from that of the power-shift transmission. Typically, the latter is a conventional mineral oil, whilst the fluid in the braking circuit is of the type normally used for that purpose. The arrangement described above prevents the contamination of each of the two fluids by the other and thus prevents the deterioration of the respective seals. Seals designed for one of the aforesaid fluids are in fact unsuitable for the other and may deteriorate in the event of contamination.

The device described above operates as follows:

as already indicated, the drawing shows the valve in the rest condition in which the pressurised fluid arriving at the inlet 12 is sent through the chamber 8 to the outlet 13 connected to the power-shift transmission. The operator can therefore selectively engage the multiple-disc clutches of the transmission by operating the usual selectors so as to make the vehicle advance. When he wishes to control the advance of the vehicle, whilst keeping the internal combustion engine at a fast running speed, the operator acts on the brake pedal to send pressurised fluid to the aperture 36, the pressure of the fluid being greater the more the pedal is pressed. The supply of pressurised fluid to the aperture 36 causes the piston 16 to move to the right (with reference to the drawing) and hence the connection member 21 and the piston 22 connected thereto to move to the right against the action of the spring 26. The movement of the piston 22 to the right causes the sleeve 25 to move to the right. The spring 30*a* forces the sleeve 28 to follow the movement of the sleeve 25 to the right. Once the resilient ring 31 comes into contact with the piston 11*a,* further movement of the piston 22 to the right causes a corresponding movement of the stem 11. When the stem 11 moves to the right, the stem 7 also moves to the right, following the movement of the stem 11, under the action of the spring 9. As indicated above, the movement of the stem 7 to the right closes the inlet 12 and the aperture 13 is put into communication with the discharge aperture 15 through the chamber 8.

The basic characteristic of the device according to the invention lies in the fact that, unlike conventional solutions, the axis 18 of the operating piston 16 is distinct from and parallel to the axis 19 of the stem 7 of the inching valve. This avoids the danger of the fluid in the braking circuit, which is used for operating the piston 16, being contaminated by the transmission oil flowing in the underlying part of the valve.

Naturally, the principle of the invention remaining the same, the details of construction and forms of embodiment may be varied widely with respect to those described and illustrated, without thereby departing from the scope of the present invention.

We claim:

1. An inching valve for vehicle power-shift transmissions, particularly for lift trucks, comprising:

a first valve stem having end portions of a larger diameter and an intermediate portion of smaller diameter;

a valve body having:

a first elongated generally cylindrical hole formed in the valve body and having a first, smaller diameter portion and a second, larger diameter portion, said first valve stem being slidably mounted in the smaller diameter portion of the first hole and the intermediate portion thereof forming therewith a first, fluid transfer chamber;

a second elongated generally cylindrical hole axially aligned with the first hole;

a third elongated generally cylindrical hole which, in a mounted position of the valve, is arranged above and generally parallel to a longitudinal axis of the first and second holes;

a first fluid inlet cavity connected to a source of a pressurized power shift transmission fluid and connectable to the first fluid transfer chamber;

a fluid outlet cavity connected to an hydraulic power shift transmission circuit and connectable to said first inlet cavity through said first fluid transfer chamber;

a first fluid discharge outlet connected to a discharge reservoir for the power shift transmission fluid and connectable, through the first fluid transfer chamber, with said fluid outlet cavity;

a second fluid inlet cavity connected to a source of a pressurized braking circuit fluid and to the third hole formed in the valve body and to a bleeder valve;

a plug closing an end of the smaller diameter portion of the first hole and forming, with an end of the first valve stem proximate thereto, a second fluid chamber communicating with the first, fluid transfer chamber through ducts in the first valve stem;

a first spring mounted in the smaller diameter portion of the first hole with one end thereof bearing on the plug and the other end thereof bearing on one end of the first valve stem proximate to the plug;

said first valve stem being slidable in the smaller diameter portion of the first hole between a rest position in which said first fluid inlet communicates, through said first fluid transfer chamber, with the fluid outlet, and an operative position in which said first fluid inlet is closed and the fluid outlet communicates with the discharge reservoir whereby pressurized fluid can be discharged through the first, fluid transfer chamber and the fluid outlet thereby releasing pressure from multiple-disc clutches of the transmission; and means to control the position of the first valve stem and thereby advance of the vehicle, comprising:

a first sleeve slidably mounted in the larger diameter portion of the first hole and having one end thereof forming a closed wall and the other end thereof partially closed by a resilient ring;

a second valve stem having a first piston slidably mounted in the first sleeve;

a second spring mounted within the first sleeve and having one end thereof bearing against the first piston and another end thereof bearing against the closed end wall of the first sleeve;

a second, valve stem control piston slidable in the third hole under the influence of pressurized braking fluid introduced into the third hole through the second fluid inlet cavity;

a second, cup-shaped sleeve slidably mounted within the second hole and having an open end and the other end formed by a wall having a central aperture;

a third spring mounted within the second sleeve and having one end thereof bearing against the apertured wall of the second sleeve and the other end thereof extending outwardly of the second sleeve and bearing against an end wall of the second hole;

a third, auxiliary piston slidably mounted within the second sleeve and outwardly thereof in the second sleeve in longitudinal coaxial alignment with and operatively connectable to the second valve stem;

a third fluid chamber formed by portions of side walls of the second hole and the third, auxiliary piston and the open end of the cup-shaped second sleeve;

a fourth fluid chamber formed by the ends of the first and second sleeves and communicating with a second fluid discharge outlet through notches formed in an end wall of the first sleeve and with the third fluid chamber through ducts formed in the third, auxiliary piston;

a fifth fluid chamber formed between the walls of the second sleeve and the walls of the second hole and communicating with the second fluid chamber;

a rod projecting from said second piston outside the valve body, and a rigid connecting member connecting said rod and said third piston, whereby said second, control piston is actuable by entry of pressurized braking fluid through said second fluid inlet, thereby moving said connecting member and said third auxiliary piston and causing said second valve stem to allow said first vale stem to move into an operative position whereby the first fluid inlet is closed and the fluid outlet is put into communication with the first fluid discharge aperture through the first fluid transfer chamber, thereby controlling advance of the vehicle.

2. An inching valve for vehicle power-shift transmissions, particularly for lift trucks, comprising:

a valve body having:

a first elongated generally cylindrical hole formed therein and comprising a smaller diameter portion and a larger diameter portion, a portion of the first hole comprising a fluid transfer chamber;

a second elongated generally cylindrical hole which, in a mounted position of the valve, is arranged above and generally parallel to a longitudinal axis of the first hole,;

a first fluid inlet cavity connected to a source of a pressurized power shift transmission fluid and connectable to said fluid transfer chamber;

a fluid outlet cavity connected to an hydraulic power shift transmission circuit and connectable to said first inlet cavity through said fluid transfer chamber;

a fluid discharge aperture connected to a discharge reservoir for the power shift transmission fluid and connectable with said fluid outlet cavity;

a second fluid inlet cavity connected to a source of a pressurized braking circuit fluid and to the second hole formed in the valve body;

a valve stem comprising a first portion mounted within the smaller diameter portion of the first hole, and a second portion mounted within the larger diameter portion of the first hole, wherein the valve stem is slidable in the first hole between a rest position in which said first fluid inlet cavity communicates, through said fluid transfer chamber, with the fluid outlet cavity, and an operative position in which said first fluid inlet cavity is closed and the fluid outlet cavity communicates with the discharge reservoir;

a first, valve stem control piston slidable in the second hole under the influence of pressurized braking fluid introduced into the second hole through said second fluid inlet cavity;

a second, auxiliary piston slidable in the first hole in longitudinal coaxial alignment with and operatively connectable to the valve stem;

a rod projecting from the first piston outside the valve body, and a rigid connecting member connecting said rod and said second piston, a closure plug closing one end of the first hole;

a first sleeve mounted about said second piston and slidable in a larger diameter portion of the first hole;

a stop element connected to said first sleeve;

a first spring mounted in the first sleeve about said second piston and having one end thereof bearing against said stop element and the other end thereof bearing against an end of said first sleeve;

a second sleeve mounted about the second portion of said valve stem and slidable in the larger diameter portion of the first hole in coaxial alignment with said first sleeve and in abutting relationship with said first sleeve;

a third piston mounted on said second portion of said valve stem within said second sleeve;

a second spring mounted in the second sleeve and having one end thereof bearing against one end of said second sleeve and the other end thereof bearing against said third piston, thereby urging said second portion of said valve stem into abutting end-to-end relationship with said first portion of said valve stem, and a third spring mounted between said closure plug and an end of said first portion of said valve stem and urging said first portion of said valve stem into abutting end-to-end relationship with said second portion of said valve stem, whereby, on entry of pressurized braking fluid through said second fluid inlet, said first piston is actuated thereby moving said connecting member and said second piston, and whereby actuation of the first piston permits said first spring to move said second piston into a position relieving the pressure applied by said second spring between said first and second portions of said valve stem and allowing said first portion of said valve stem to move into an operative position.

* * * * *